United States Patent [19]
Sugi et al.

[11] Patent Number: 5,301,064
[45] Date of Patent: Apr. 5, 1994

[54] REAR FOCUSING TYPE ZOOM LENS SYSTEM

[75] Inventors: Yasuyuki Sugi, Ibaraki; Yoshiaki Tachibana, Katsuta, both of Japan

[73] Assignee: Hitachi, Ltd., Tokyo, Japan

[21] Appl. No.: 680,703

[22] Filed: Apr. 4, 1991

[30] Foreign Application Priority Data

Apr. 6, 1990 [JP] Japan .................. 2-90326

[51] Int. Cl.⁵ .................................. G02B 15/14
[52] U.S. Cl. ........................... 359/684; 359/676; 359/683
[58] Field of Search ............ 359/646, 676, 691, 692, 359/746, 765, 686

[56] References Cited

U.S. PATENT DOCUMENTS 5,048,939  9/1991  Yatsu et al. .................. 359/676

FOREIGN PATENT DOCUMENTS 1-068709  3/1989  Japan .
1-113715  5/1989  Japan .
1-134413  5/1989  Japan .

Primary Examiner—Bruce Y. Arnold
Assistant Examiner—Hung Xuan Dang
Attorney, Agent, or Firm—Antonelli, Terry, Stout & Kraus

[57] ABSTRACT

A rear focusing type zoom lens system which comprises, as arrayed sequentially when viewed from the object side, a first lens group having a positive refracting power, second and third lens groups having negative refracting powers, respectively, and serving for zooming function when moved along an optical axis, a fourth lens group having a positive refracting power and constantly fixed stationarily, and a fifth lens group having a positive refracting power and serving for image formation function, wherein focusing is performed by moving a single lens element of the fifth lens group along the optical axis. Due to this arrangement, the number of the lens elements required to move for focusing can be reduced while assuring a high variable magnification power and a smaller F-value.

11 Claims, 21 Drawing Sheets

REAR FOCUSING TYPE ZOOM LENS SYSTEM

BACKGROUND OF THE INVENTION

The present invention relates generally to a zoom lens system of a high variable magnification power and more particularly to a rear focusing type zoom lens system suited profitably for use in video cameras and the like.

As the prior art zoom lens system used in video cameras and the like, there is known one of such lens arrangement as disclosed in JP-A-63-133114 (and shown in FIG. 1 of the accompanying drawings) in which a first lens group located in opposition to the object and composed of three lens elements is moved along the optical axis for effecting the zooming operation.

Besides, there are known other structures of zoom lens systems in which the focusing is performed by moving a plurality or a few lens elements located closer to the plane of image formation. Reference may be made to JP-A-1-134413, for example.

In many of the zoom lens systems, driving means for moving the lens elements or lens group as mentioned above is constituted by an electric motor. In that case, it is preferred that the weight or load of the lens elements to be moved should be as low as possible because the motor can thereby be miniaturized correspondingly. In this conjunction, the prior art zoom lens systems mentioned above suffer from a problem that the weight of the lens elements to be moved for focusing and hence the load imposed on the motor is heavy because the focusing is accomplished by moving a lens group including three or more lens elements. An attempt for realizing the focusing by moving a single lens element has encountered difficulty in that the F-number has to be increased and the zoom ratio must be low in order to correct aberrations satisfactorily.

SUMMARY OF THE INVENTION

It is therefore an object of the present invention to decrease the number of lens elements required to be moved for the focusing while ensuring a high variable power and a small F-number.

It is another object of the present invention to provide a zoom lens system in which the focusing can be accomplished by moving only one lens element while assuring a high zoom ratio on the order of six or higher with a small F-number of about 1.8 at a wide angle end (for a plane of image formation in a size of ½ inch) and in which the aberrations are corrected satisfactorily.

In view of the above objects, there is provided according to a general aspect of the invention a rear focusing type zoom lens system which comprises a first lens group having a positive refracting power, second and third lens groups having negative refracting powers, respectively, and serving for zooming function when moved along an optical axis, a fourth lens group having a positive refracting power and constantly fixed stationarily, and a fifth lens group having a positive refracting power and serving for image formation function, the first to fifth lens groups being arrayed in this order as viewed in the direction away from the object, wherein focusing is performed by moving a single lens element of the fifth lens group along the optical axis.

In the arrangement of the zoom lens system described above, it is preferred that at least one of the requirements (i) to (iv) mentioned below be satisfied in order to obtain the zoom lens system which can enjoy improved performance.

(i) The fourth lens group should include a lens element having at least one surface which is aspherical.

(ii) The fifth lens group should be composed of a first lens element having a positive refracting power, a second lens element having a negative refracting power and a third lens element having a positive refracting power which are arrayed in this order when viewed in the direction from the object side.

(iii) The third lens element of the fifth lens group mentioned above should be moved along the optical axis for focusing operation.

(iv) In conjunction with the requirement (iii), the following condition should be satisfied:

$$f_F/f_W > 2.8$$

where $f_F$ represents a focal length at a wide angle end of a lens assembly including the first lens group to the second lens element of the fifth lens group and $f_W$ represents a focal length at a wide angle end of the whole zoom system, or more preferably the following condition should be satisfied:

$$2.8 < f_F/f_W < 10.0.$$

In the rear focusing type zoom lens system according to the invention, the focusing is realized by moving a single lens element belonging to the fifth lens group which brings about less variation in the aberrations with a view to ensuring more satisfactory correction of the aberrations of the zoom lens system. As the measures or means for suppressing the variation in the aberrations upon focusing by compensating for the aberration inherent to the single movable lens element of the fifth lens group, there may be adopted at least one of methods (i) to (v) mentioned below.

(i) An aspherical lens is included in the fourth lens group for the purpose of correcting the aspherical aberration primarily by the aspherical surface of this lens to thereby reduce as far as possible the amount of aspherical aberration to be compensated for by the single movable lens of the fifth lens group.

(ii) The fifth lens group is constituted by a triplet lens structure consisting of a first lens element having a positive refracting power, a second lens element having a negative refracting power and a third lens element having a positive refracting power, wherein the lens element which brings about least the variation in the aberration when moved is selected as the single lens element mentioned above.

(iii) In conjunction with the measure (ii), the third lens of the fifth lens group as viewed in the direction away from the object is moved upon focusing.

(ix) In conjunction with the measure (iii), the focal length $f_F$ at a wide single end of the lens assembly including the first lens group to the second lens of the fifth lens group is selected 2.8 times as long as the focal length $f_W$ of the whole zoom lens system at the wide angle end. In other words, the bundle of light rays impinging on the third lens element of the fifth group is collimated or converged more or less.

(v) In conjunction with the abovementioned measure (iii), the focal length $f_F$ at the wide angle end of the lens assembly including the first lens group to the second lens element of the fifth group may preferably be selected at a value in a range of 2.8 to 10 times as long as the focal length $f_W$ of the whole zoom lens system. In this way, the angle at which the bundle of light rays is incident on the third lens element of the fifth group is made rather convergent. By virtue of this arrangement, the positive refracting power to be born by the third lens element of the fifth lens group can be decreased, whereby the contribution of the third lens element of the fifth group to the occurrence of aberrations can be reduced, which in turn means that variation in the aberrations attributable to the movable lens element of the fifth lens group can be reduced with the variation in aberration occurring in the whole lens system upon focusing being thus mitigated. In this conjunction, it is however noted that the displacement of the third lens element of the fifth lens group is great when compared with the lens arrangement in which the incident light rays are collimated. However, increasing in such displacement of the third lens element of the fifth group upon focusing is only of a negligible amount, giving rise to substantially no problems in practical applications.

BRIEF DESCRIPTION OF THE DRAWINGS

FIGS. 3A to 11C are characteristic diagrams showing optical aberration characteristic curves of the zoom lens system shown in FIG. 2;

FIG. 13A to 21C are diagrams illustrating optical aberration characteristics of the zoom lens system shown in FIG. 12.

DESCRIPTION OF THE PREFERRED EMBODIMENTS

Now, the present invention will be described in detail in conjunction with preferred or exemplary embodiments of thereof by reference to the drawings.

Figure 1:
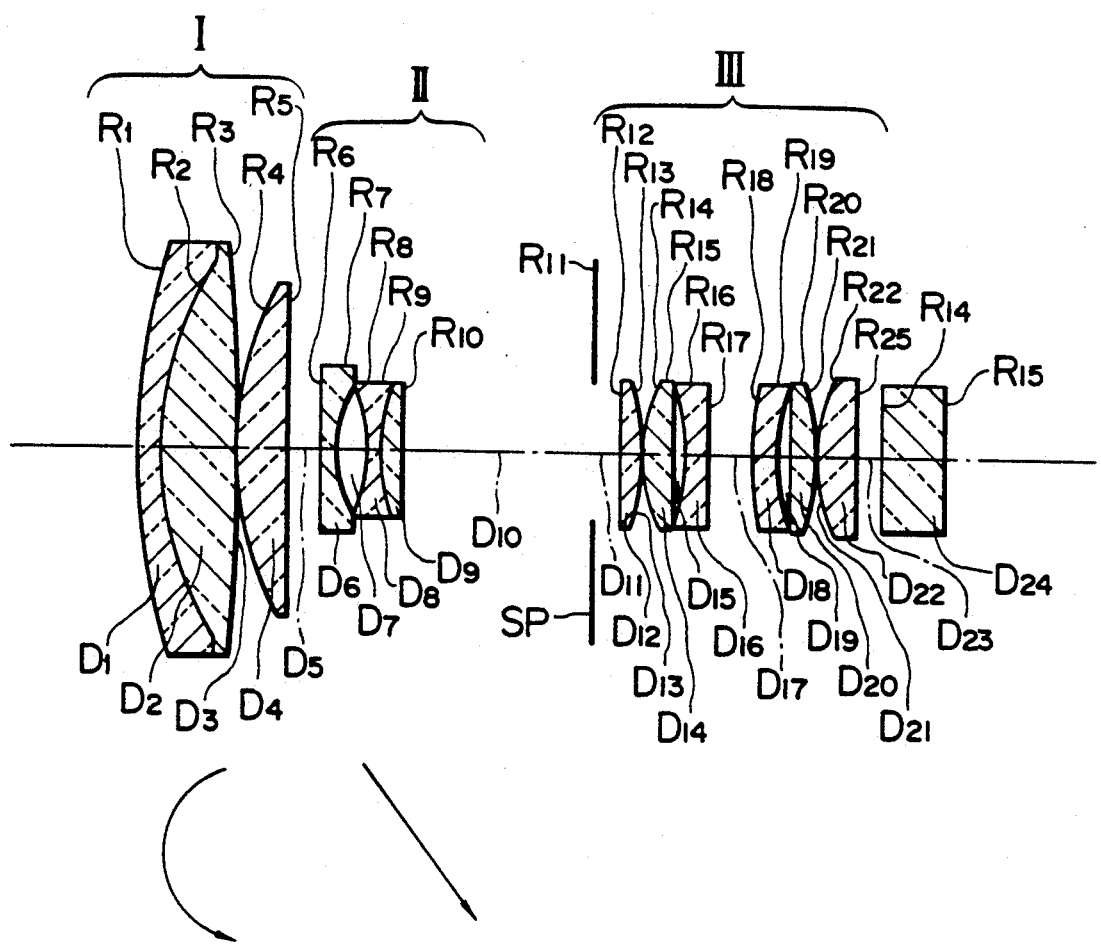
FIG. 1 is a longitudinal sectional view showing a lens arrangement of a zoom lens system known heretofore.
Figure 2:
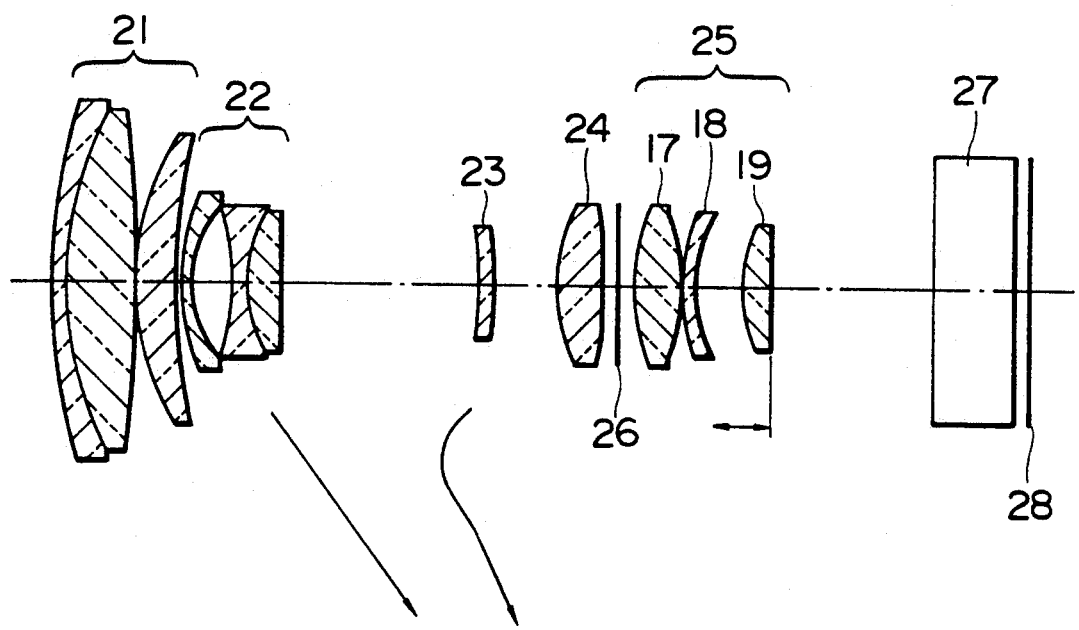
FIG. 2 is a longitudinal sectional view showing a lens arrangement of a rear focusing type zoom lens system according to a first embodiment of the present invention.

A rear focusing type zoom lens system according to a first embodiment of the invention will be described by reference to FIGS. 2 to 21, in which FIG. 2 is a longitudinal sectional view of the same for illustrating the lens structure thereof. Referring to FIG. 2, the rear focusing type zoom lens system includes a first lens group 21 exhibiting a positive refracting power, second and third lens groups 22 and 23 exhibiting negative refracting powers, respectively, and movable relative to each other along the optical axis, a fourth lens group 24 exhibiting a positive refracting power and constantly held stationary, a fifth lens group 25 having a positive refracting power and interposed between a stop or diaphragm 26 and an image plane 28 for image formation and a crystalline filter 27, which are arrayed in the order mentioned above as viewed in the direction away from the object.

In the case of the rear focusing type zoom lens system according to the first embodiment now under consideration, the fifth lens group 25 is constituted by three lens elements, i.e. a first lens element 17, a second lens element 18 and a third lens element 19, wherein the first lens element 17 and the second lens element 18 are held constantly stationarily with only the third lens element 19 being movable along the optical axis upon focusing of the zoom lens system. The lens element constituting the fourth lens group 24 has an aspherical surface on the side facing the object, wherein correction of aspherical aberration is performed predominantly by this aspherical surface.

When a focal length at a wide angle end of the lens assembly including the first lens element 21 of the first lens group to the second lens element 18 of the fifth lens group is represented by $f_F$ while representing the focal length of the whole zoom lens system at the wide angle end by $f_W$, there applies the following relation.

$$f_F/f_W = 3.56$$

More specifically, the light rays impinge rather convergently on the third lens element 19 of the fifth lens group to thereby reduce as far as possible the refracting power to be imposed on the third lens element 19 of the fifth group for the purpose of suppressing variation in the aberrations brought about by the movement of the third lens element 19 of the fifth lens group upon focusing.

Mentioned below are numerical examples of dimensions of the zoom lens system shown in FIG. 2 on the assumption that it has a focal length in the range of 9.2 to 51.1 and a F-number (value) of 1.8.

| | | |
|---|---|---|
| $r_1 = 52.05$, | $d_1 = 0.90$, | $n_1 = 1.8467$, $v_1 = 23.9$, |
| $r_2 = 27.89$, | $d_2 = 5.23$, | $n_2 = 1.5891$, $v_2 = 61.3$, |
| $r_3 = -89.81$, | $d_3 = 0.20$, | |
| $r_4 = 22.17$, | $d_4 = 2.77$, | $n_3 = 1.5891$, $v_3 = 61.3$, |
| $r_5 = 45.65$, | $d_5 = $ variable, | |
| $r_6 = 18.91$, | $d_6 = 0.85$, | $n_4 = 1.7432$, $v_4 = 49.3$, |
| $r_7 = 8.827$, | $d_7 = 3.16$ | |
| $r_8 = -14.58$, | $d_8 = 0.85$, | $n_5 = 1.7432$, $v_5 = 49.3$, |
| $r_9 = 9.945$, | $d_9 = 2.51$, | $n_6 = 1.8467$, $v_6 = 23.9$, |
| $r_{10} = 264.2$, | $d_{10} = $ variable, | |
| $r_{11} = -16.46$, | $d_{11} = 0.85$, | $n_7 = 1.7495$, $v_7 = 35.3$, |
| $r_{12} = -75.22$, | $d_{12} = $ variable, | |
| $r_{13}{}^* = 12.60$, | $d_{13} = 3.27$, | $n_8 = 1.4875$, $v_8 = 70.5$, |
| $r_{14} = -57.35$, | $d_{14} = 1.16$, | |
| $r_{15} = \infty$ (diaphragm), | $d_{15} = 1.40$, | |
| $r_{16} = 20.56$, | $d_{16} = 3.10$, | $n_9 = 1.4875$, $v_9 = 70.5$, |
| $r_{17} = -22.65$, | $d_{17} = 0.20$, | |
| $r_{18} = 14.63$, | $d_{18} = 0.85$, | $n_{10} = 1.8467$, $v_{10} = 23.9$, |
| $r_{19} = 8.851$, | $d_{19} = $ variable, | |
| $r_{20} = 17.745$, | $d_{20} = 1.94$, | $n_{11} = 1.5891$, $v_{11} = 61.3$, |
| $r_{21} = -86.65$, | $d_{21} = $ variable, | |
| $r_{22} = \infty$, | $d_{22} = 6.00$, | $n_{12} = 1.5168$, $v_{12} = 64.2$, |
| $r_{23} = \infty$. | | |

In the above, $r_i$ ($i = 1$–$23$ in this case) represents a radius of curvature of the i-th lens surface counted from the object side, wherein the curvature radius is assigned with a positive value when the relevant lens surface is oriented facing toward the image plane while a negative value is imparted when the associated lens surface faces toward the object. Further, $d_i$ ($i = 1$–$22$) represents a distance between the i-th lens surface and the succeeding (i+1)-th lens surface as measured along the optical axis. Additionally, $n_i$ and $v_i$ ($i = 1$–$12$) represent the refractive index and the Abbe's number of the i-th lens as viewed from the object side. The distances $d_5$, $d_{10}$ and $d_{12}$ vary in dependence on the focal length f of the zoom lens system, as exemplified in the following table 1.

TABLE 1

| f (mm) | $d_5$ (mm) | $d_{10}$ (mm) | $d_{12}$ (mm) |
|---|---|---|---|
| 9.2 | 0.41 | 15.09 | 4.89 |
| 32.7 | 14.44 | 1.75 | 4.21 |
| 51.0 | 17.28 | 2.62 | 0.50 |

On the other hand, the distances $d_{19}$ and $d_{21}$ vary as a function of the object distance and the focal length f, concrete examples of which are shown in the following tables 2, 3 and 4.

TABLE 2

| | (object distance: $\infty$) | |
|---|---|---|
| f (mm) | $d_{19}$ (mm) | $d_{21}$ (mm) |
| 9.2 | 4.00 | 12.00 |
| 32.7 | 4.00 | 12.00 |
| 51.0 | 4.00 | 12.00 |

TABLE 3

| | (object distance: 2 m) | |
|---|---|---|
| f (mm) | $d_{19}$ (mm) | $d_{21}$ (mm) |
| 9.2 | 3.95 | 12.05 |
| 32.7 | 3.44 | 12.56 |
| 51.0 | 2.66 | 13.35 |

TABLE 4

| | (object distance: 1.2 m) | |
|---|---|---|
| f (mm) | $d_{19}$ (mm) | $d_{21}$ (mm) |
| 9.2 | 3.93 | 12.08 |
| 32.7 | 3.10 | 12.90 |
| 51.0 | 1.82 | 14.18 |

The lens surface having the curvature radius affixed with "*", i.e. the lens surface of $r_{13}$ is aspherical (glass), the geometry or shape of which is given by aspherical coefficients as follows:

$$Z = CY/\{1 + \sqrt{1 - (K + 1)C^2Y^2}\} + A_4Y^4 + A_6Y^6 + A_8Y^8 + A_{10}Y^{10}$$

where Z represents a distance between points lying, respectively, on the aspherical surface and a plane tangential to the vertex thereof at a height Y from the optical axis, C represents a curvature (1/r) of a standard spherical surface, K represents a circular cone constant, Y represents a height from the optical axis, and $A_4$ to $A_{10}$ represent the aspherical coefficients of fourth to tenth orders, respectively.

In the case of the instant embodiment, the aspherical coefficients of the 13-th lens surface as viewed from the object side are selected as follows:

For $C = 0.079365 (= 1/r_{13})$ and $K = -1.67906$, $A_4 = -1.392 \times 10^{-4}$, $A_6 = 1.873 \times 10^{-6}$, $A_8 = -5.133 \times 10^{-8}$ and $A_{10} = 5.444 \times 10^{-10}$.

Figure 3:
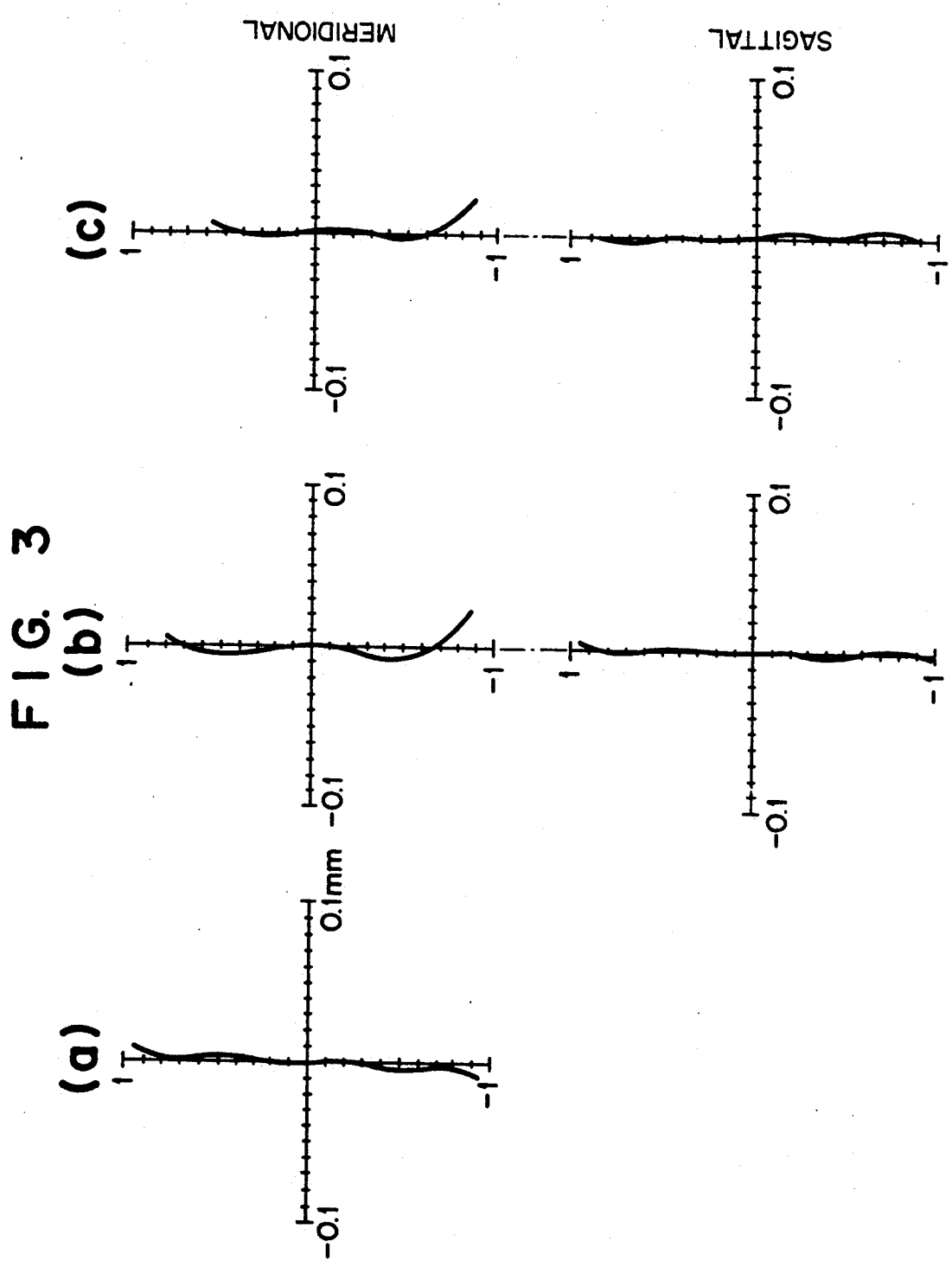
Figure 4:
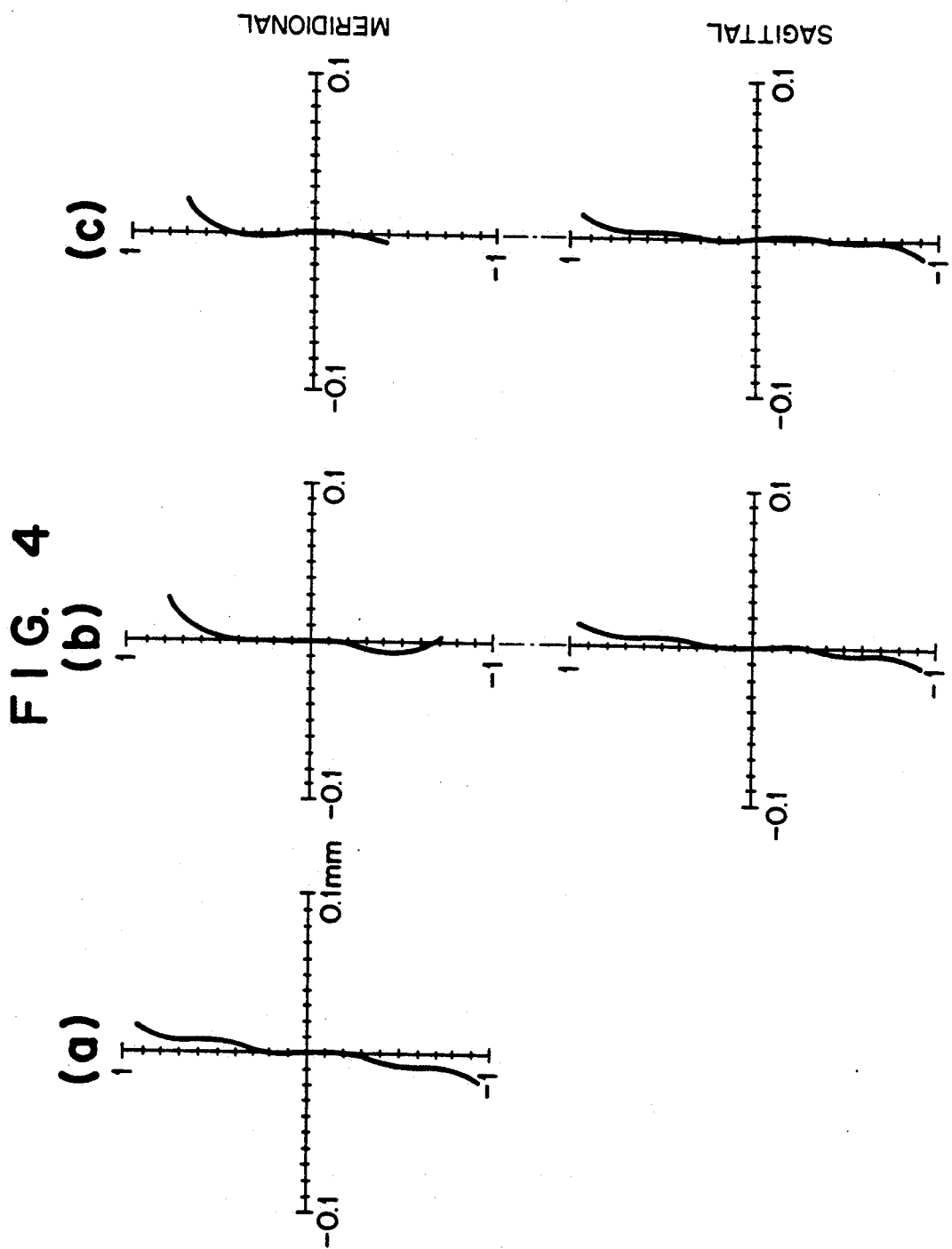
Figure 5:
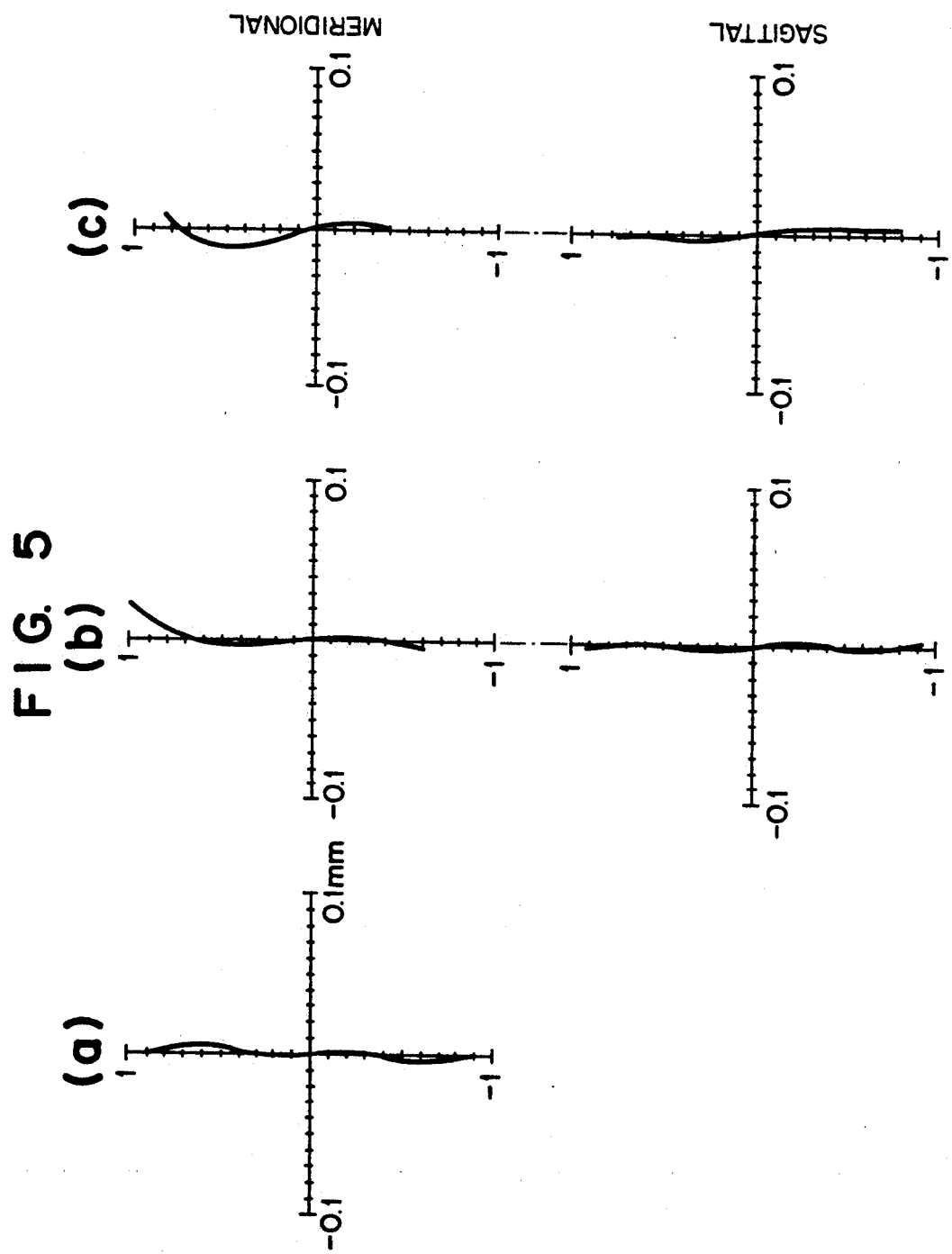
Figure 6:
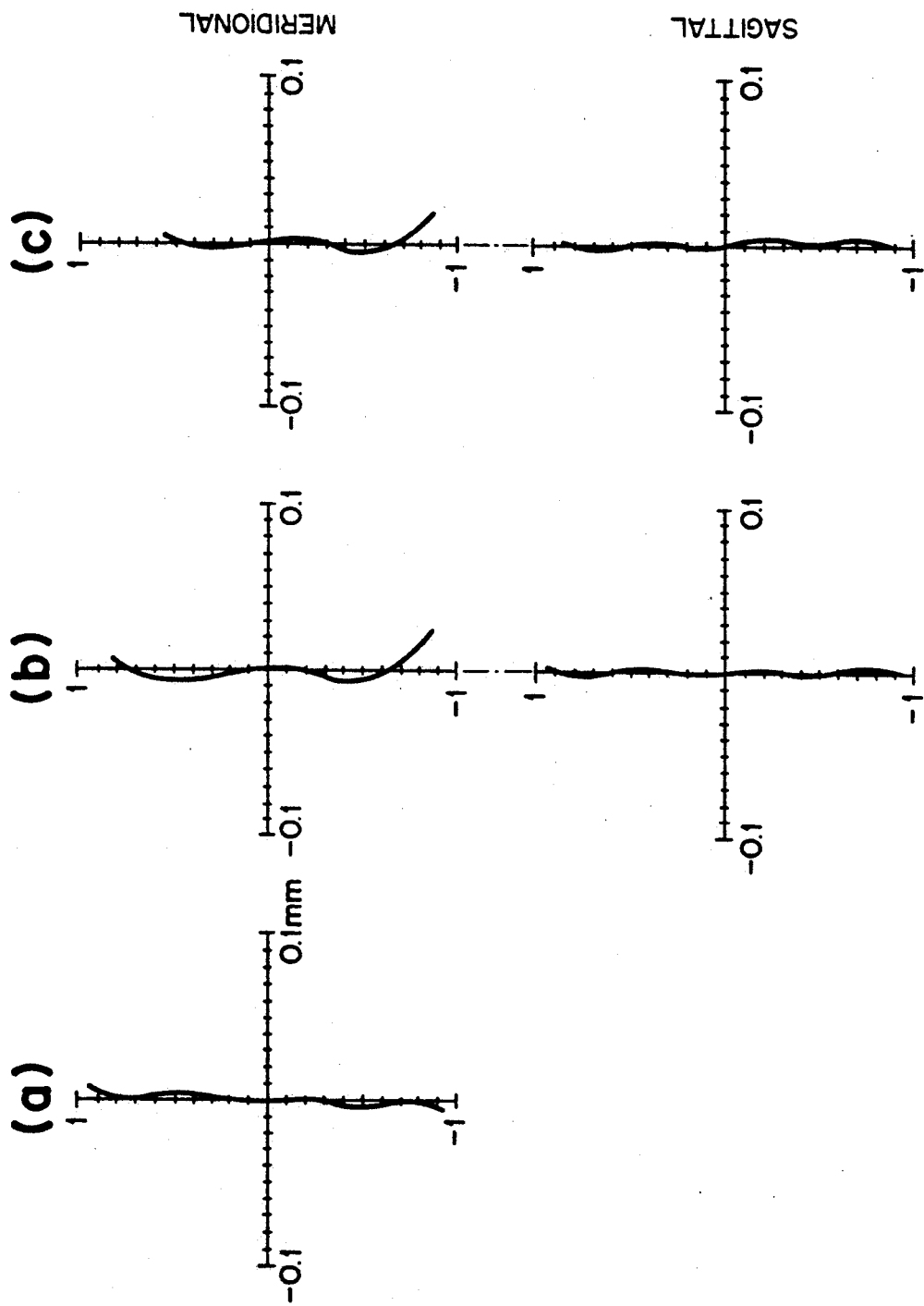
Figure 7:
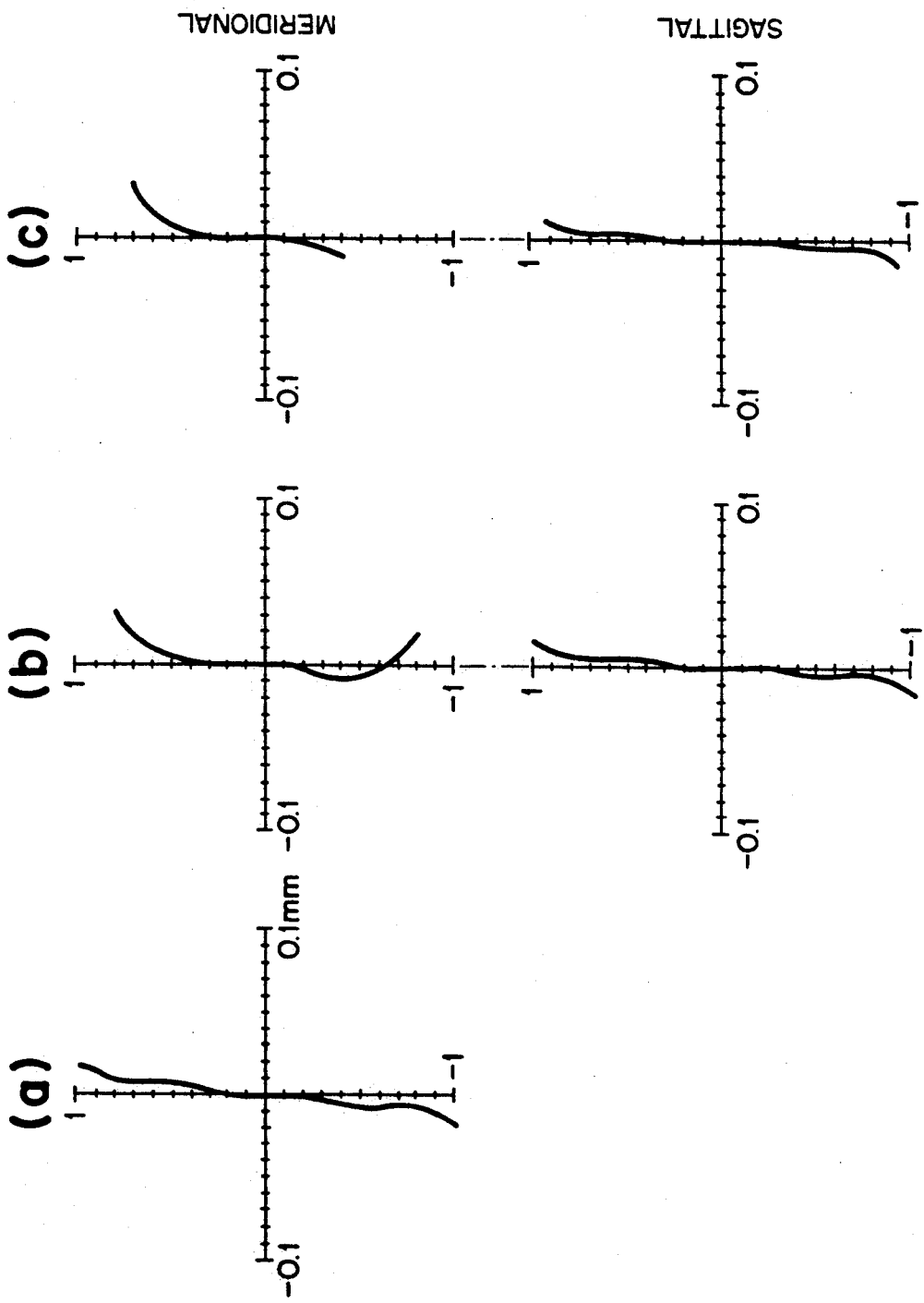
Figure 8:
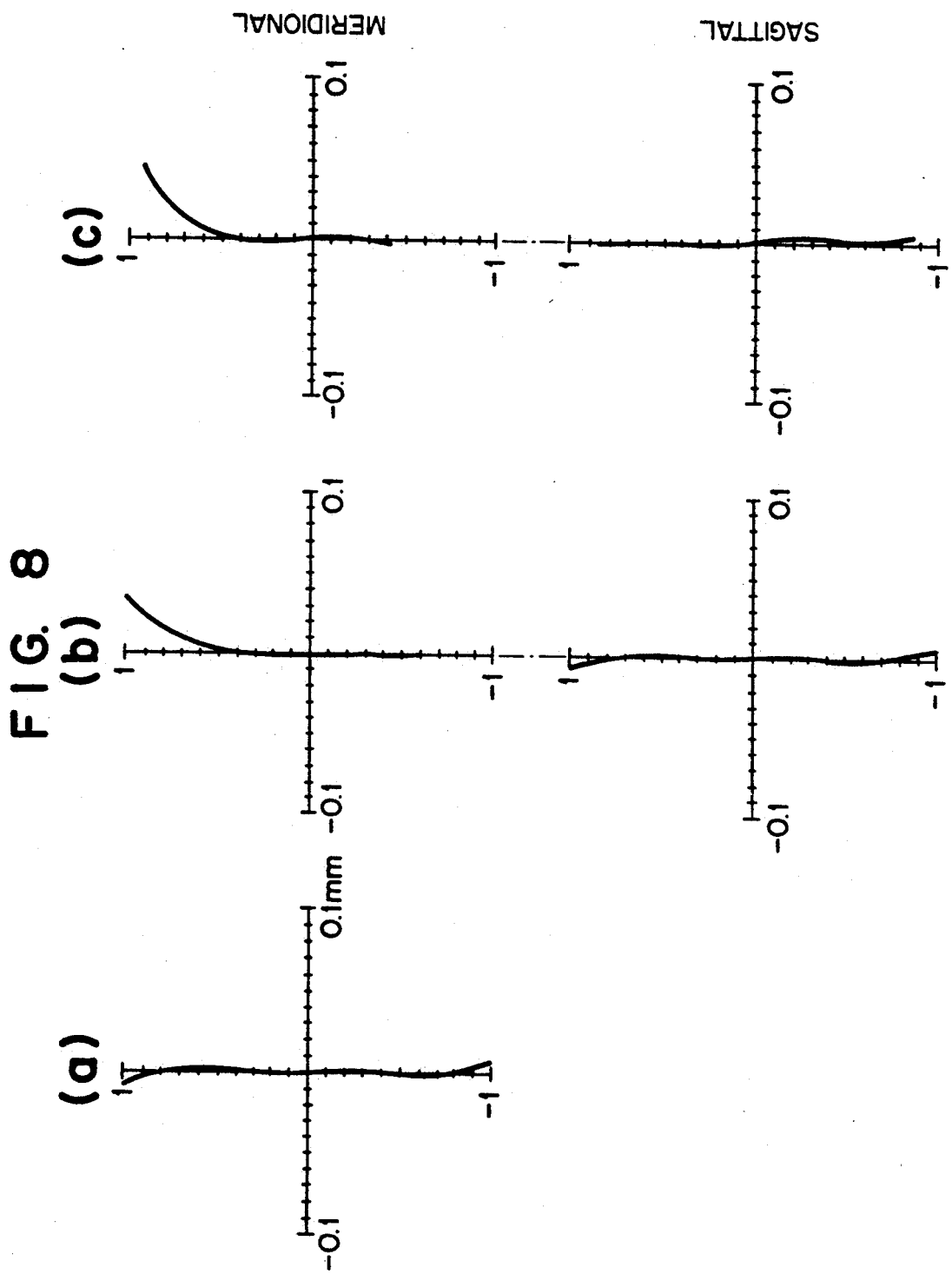
Figure 9:
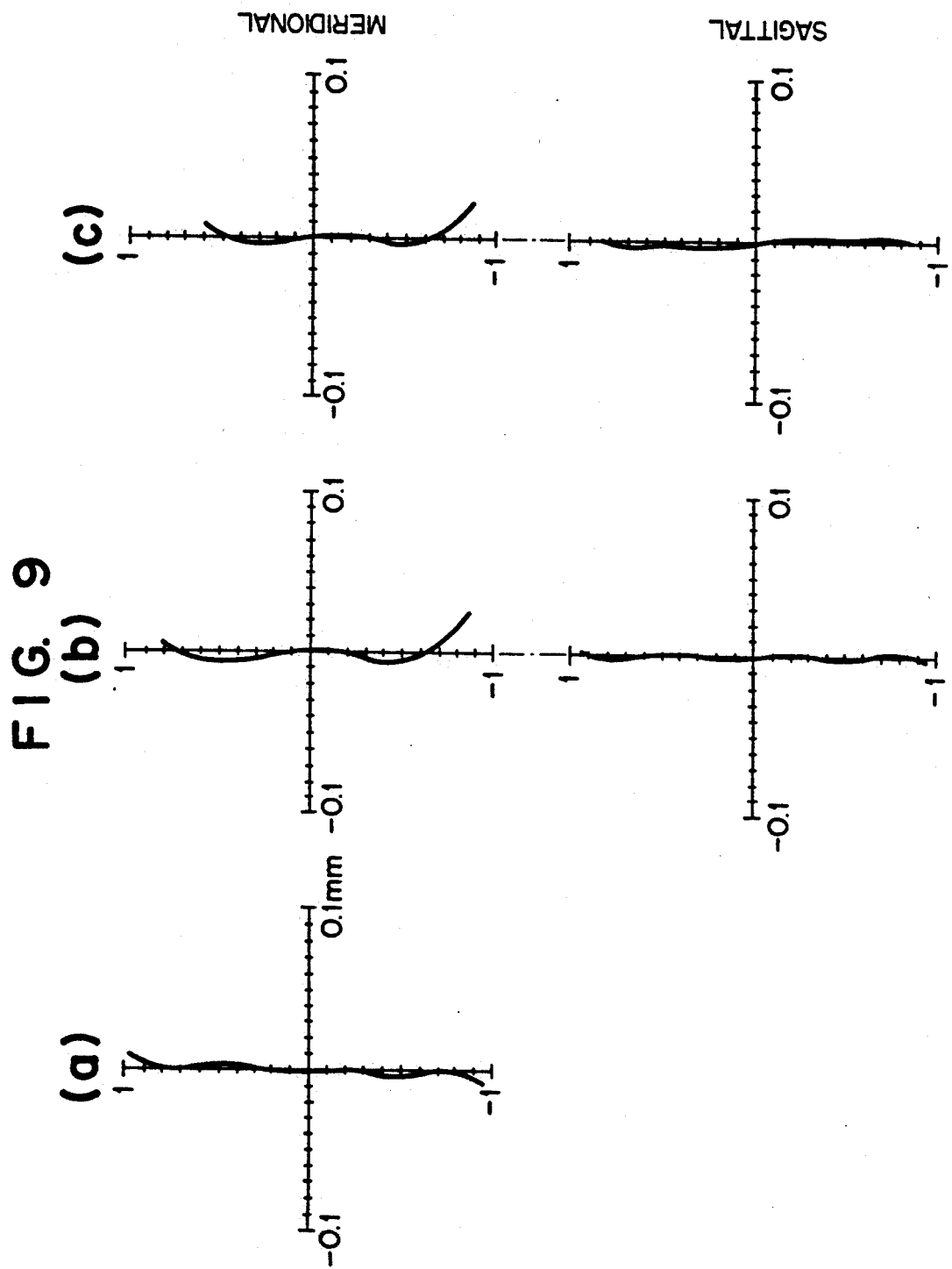
Figure 10:
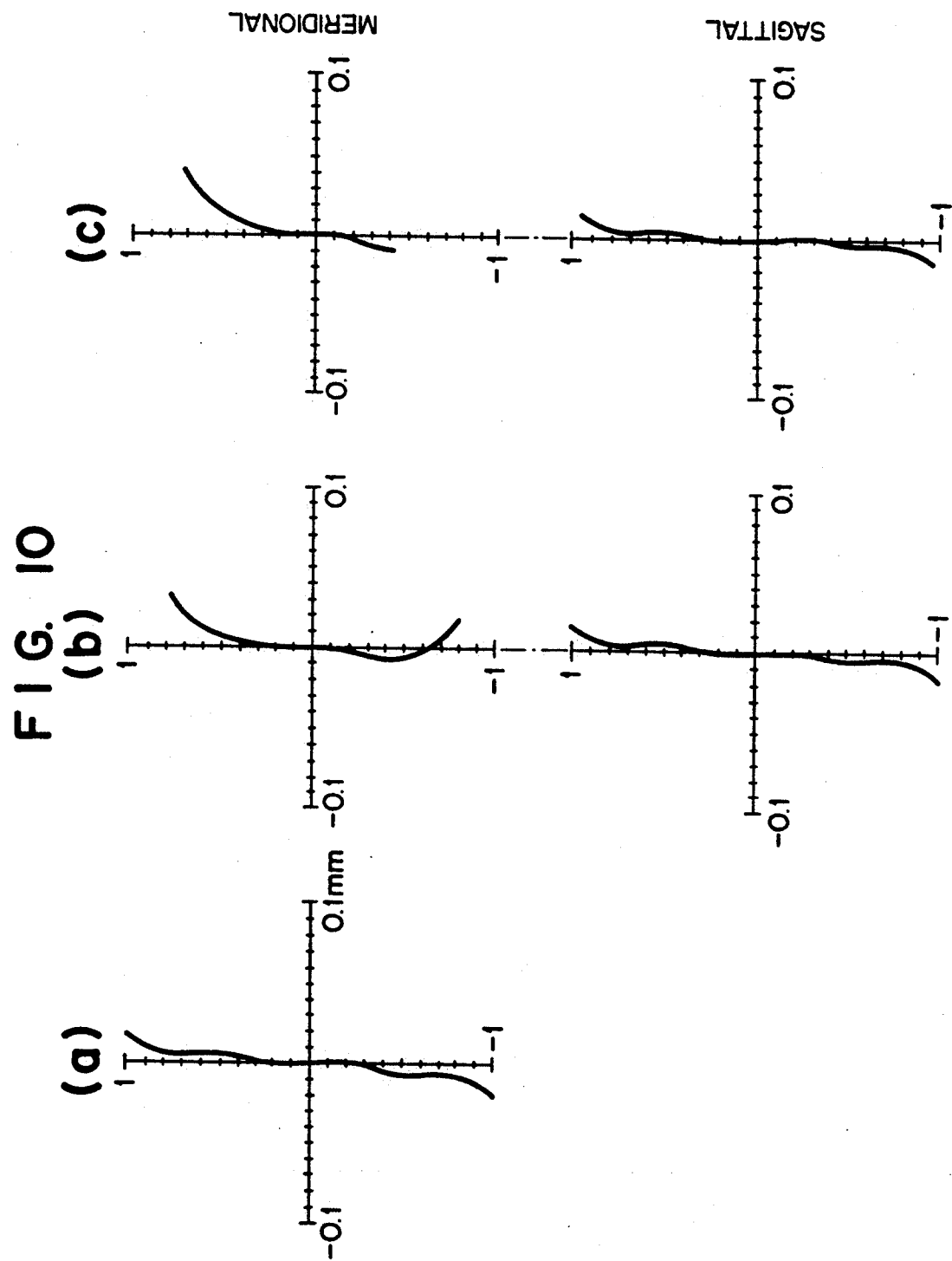
Figure 11:
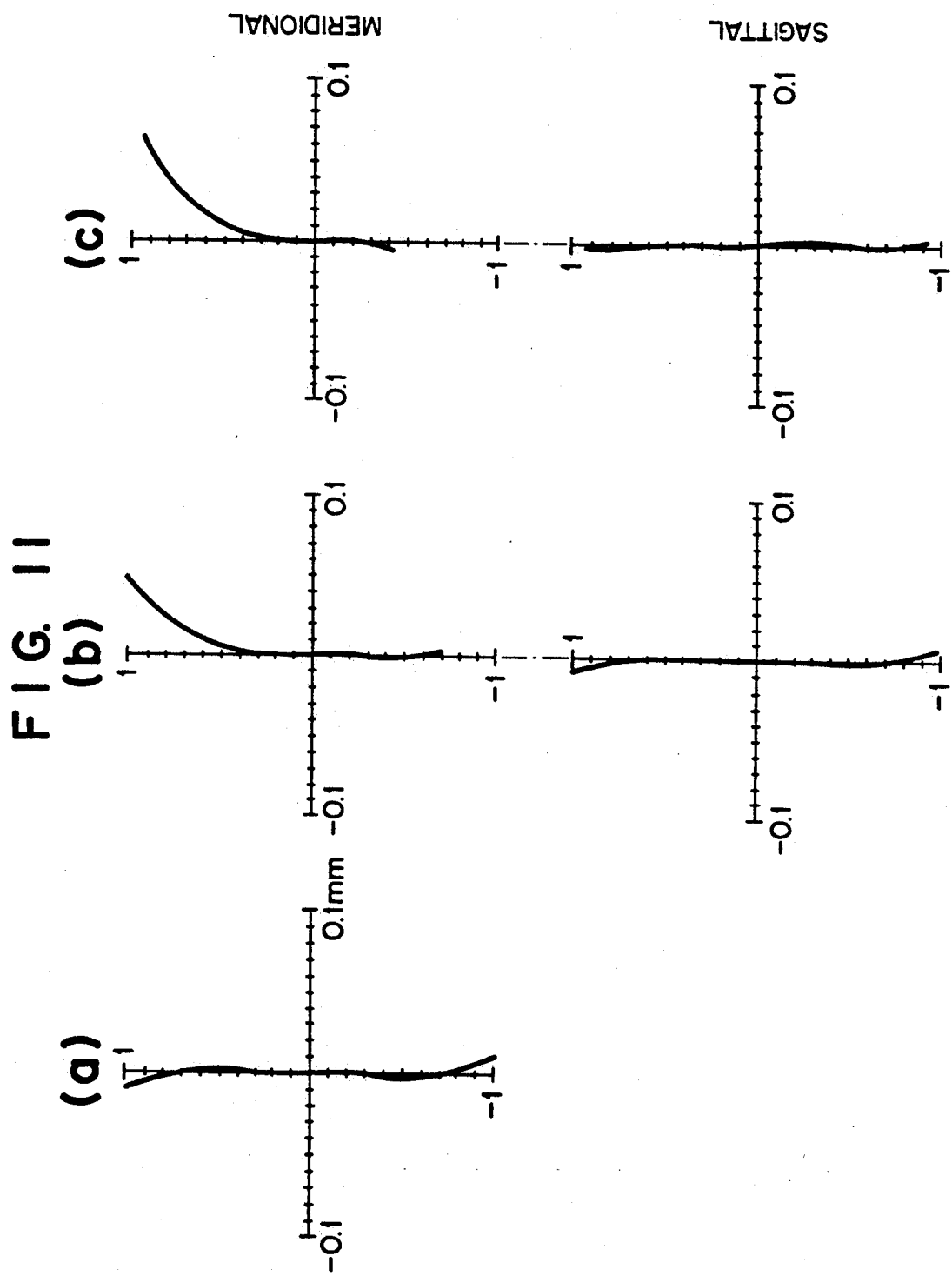

FIGS. 3 to 5 show characteristic curves representing aberrations of the zoom lens system according to the first embodiment described above at the focal lengths of 9.2 mm, 32.7 mm and 51.0 mm, respectively, when the object distance is infinite ($\infty$). FIGS. 6 to 8 are characteristic curves representative of aberrations appearing at the abovementioned focal lengths, respectively, when the object distance is 2 m. FIGS. 9 to 11 show characteristic curves of aberrations at the focal lengths mentioned above, respectively, when the object distance is 1.2 m.

Of the characteristic curves mentioned above, those shown at (a) are taken at the center of the imagery plane (plane where image is formed), at the respective focal lengths, the characteristic curves shown at (b) are taken at the height on the imagery plane corresponding to 0.6 times the maximum field angle at the respective focal lengths, and the characteristic curves shown at (c) are taken at the height corresponding to 0.9 times the maximum field angle at the respective focal lengths.

Figure 12:
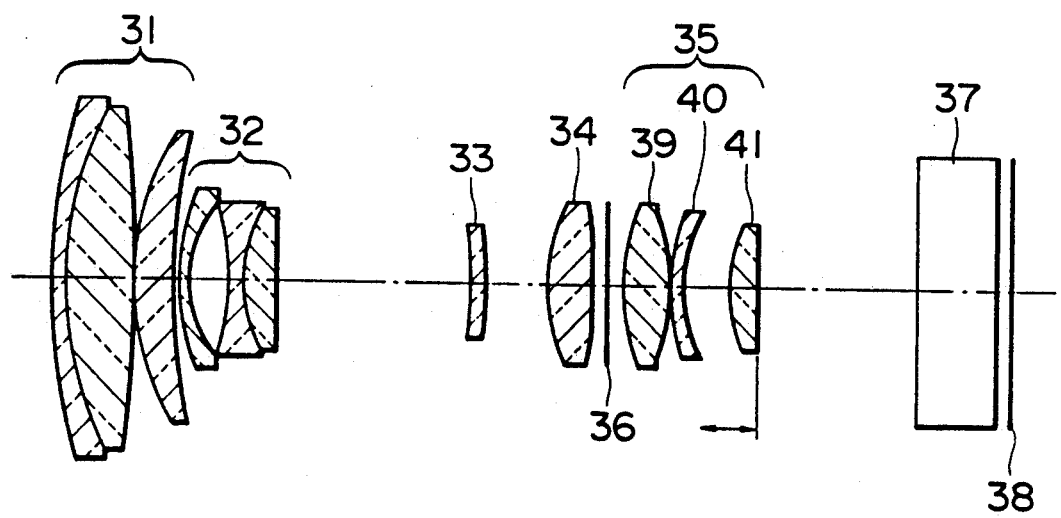
FIG. 12 is a longitudinal sectional view of a rear focusing type zoom lens system according to a second embodiment of the invention.

FIG. 12 shows in a longitudinal section a rear focusing type zoom lens system according to a second embodiment of the present invention. Exemplary numerical values of the optical parameters of this lens system are given below on the assumption that the focal length f of the zoom lens system is in a range of 9.2 to 51.0 and that the F-value is equal to 1.8. The zoom lens system according to the second embodiment differs from that of the first embodiment in respect to the aspherical coefficients, the curvature radii $r_{14}$, $r_{16}$, $r_{17}$, $r_{18}$, $r_{19}$, $r_{20}$, $r_{21}$ and the distances $d_{14}$, $d_{15}$, $d_{16}$, $d_{17}$, $d_{18}$, $d_{19}$, $d_{20}$ and $d_{21}$.

| | | | |
|---|---|---|---|
| $r_1 = 52.05$, | $d_1 = 0.90$, | $n_1 = 1.8467$, | $v_1 = 23.9$, |
| $r_2 = 27.89$, | $d_2 = 5.23$, | $n_2 = 1.5891$, | $v_2 = 61.3$, |
| $r_3 = -89.81$, | $d_3 = 0.20$, | | |
| $r_4 = 22.17$, | $d_4 = 2.77$, | $n_3 = 1.5891$, | $v_3 = 61.3$, |
| $r_5 = 45.65$, | $d_5 =$ variable. | | |
| $r_6 = 18.91$, | $d_6 = 0.85$, | $n_4 = 1.7432$, | $v_4 = 49.3$, |
| $r_7 = 8.827$, | $d_7 = 3.16$ | | |
| $r_8 = -14.58$, | $d_8 = 0.85$, | $n_5 = 1.7432$, | $v_5 = 49.3$, |
| $r_9 = 9.945$, | $d_9 = 2.51$, | $n_6 = 1.8467$, | $v_6 = 23.9$, |
| $r_{10} = 264.2$, | $d_{10} =$ variable. | | |
| $r_{11} = -16.46$, | $d_{11} = 0.85$, | $n_7 = 1.7495$, | $v_7 = 35.3$, |
| $r_{12} = -75.22$, | $d_{12} =$ variable. | | |
| $r_{13}* = 12.60$, | $d_{13} = 3.27$, | $n_8 = 1.4875$, | $v_8 = 70.5$, |
| $r_{14} = -57.286$, | $d_{14} = 1.16$, | | |
| $r_{15} = \infty$ (diaphragm), | $d_{15} = 2.00$, | | |
| $r_{16} = 17.90$, | $d_{16} = 3.10$, | $n_9 = 1.4875$, | $v_9 = 70.5$, |
| $r_{17} = -29.84$, | $d_{17} = 0.20$, | | |
| $r_{18} = 14.69$, | $d_{18} = 0.85$, | $n_{10} = 1.8467$, | $v_{10} = 23.9$, |
| $r_{19} = 8.607$, | $d_{19} =$ variable. | | |
| $r_{20} = 15.61$, | $d_{20} = 1.94$, | $n_{11} = 1.5891$, | $v_{11} = 61.3$, |
| $r_{21} = -88.50$, | $d_{21} =$ variable. | | |
| $r_{22} = \infty$, | $d_{22} = 6.00$, | $n_{12} = 1.5168$, | $v_{12} = 64.2$, |
| $r_{23} = \infty$. | | | |

In the above, the distances $d_5$, $d_{10}$ and $d_{12}$ vary in dependence with the focal length f, as exemplified in the following table 5.

TABLE 5

| f (mm) | $d_5$ (mm) | $d_{10}$ (mm) | $d_{12}$ (mm) |
|---|---|---|---|
| 9.2 | 0.41 | 15.09 | 4.89 |
| 32.7 | 14.44 | 1.75 | 4.21 |
| 51.0 | 17.28 | 2.62 | 0.50 |

Further, the distances $d_{19}$ and $d_{21}$ vary as a function of the object distance and the focal length f, as exemplified by the following tables 6, 7 and 8.

TABLE 6

| f (mm) | (object distance: ∞) d₁₉ (mm) | d₂₁ (mm) |
| --- | --- | --- |
| 9.2 | 4.00 | 12.00 |
| 32.7 | 4.00 | 12.00 |
| 51.0 | 4.00 | 12.00 |

TABLE 7

| f (mm) | (object distance: 2 m) d₁₉ (mm) | d₂₁ (mm) |
| --- | --- | --- |
| 9.2 | 4.36 | 12.04 |
| 32.7 | 3.87 | 12.53 |
| 51.0 | 3.11 | 13.29 |

TABLE 8

| f (mm) | (object distance: 1.2 m) d₁₉ (mm) | d₂₁ (mm) |
| --- | --- | --- |
| 9.2 | 4.33 | 12.07 |
| 32.7 | 3.53 | 12.87 |
| 51.0 | 2.30 | 14.10 |

The lens surface $r_{13}$ affixed with asterisk mark is aspherical and has the aspherical coefficients mentioned below:

For $C = 0.079365 \ (= 1/r_{13})$ and $K = -1.3955$.

$A_4 = -1.261 \times 10^{-4}$, $A_6 = 1.563 \times 10^{-6}$.

$A_8 = -3.822 \times 10^{-8}$ and $A_{10} = 3.924 \times 10^{-10}$.

In the case of the zoom lens system according to the second embodiment of the invention having the numerical values exemplified above, there exists the relation mentioned below between the focal length $f_F$ at a wide angle end of the lens assembly including the first lens group 31 to the second lens element 40 of the fifth lens group and the focal length $f_W$ at the wide angle end of the whole zoom lens system.

$f_F/f_W = 5.13$

Figure 13:
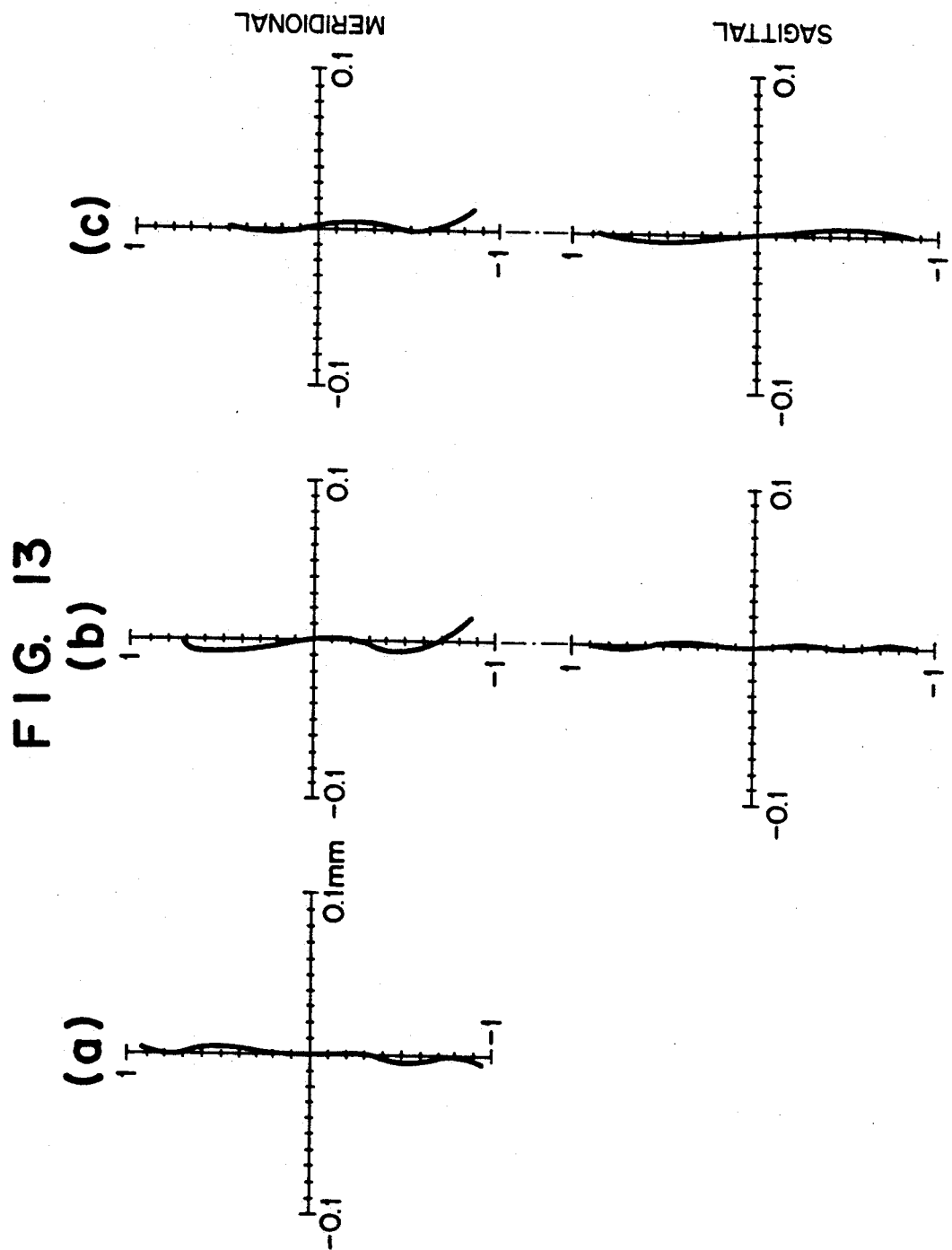
Figure 14:
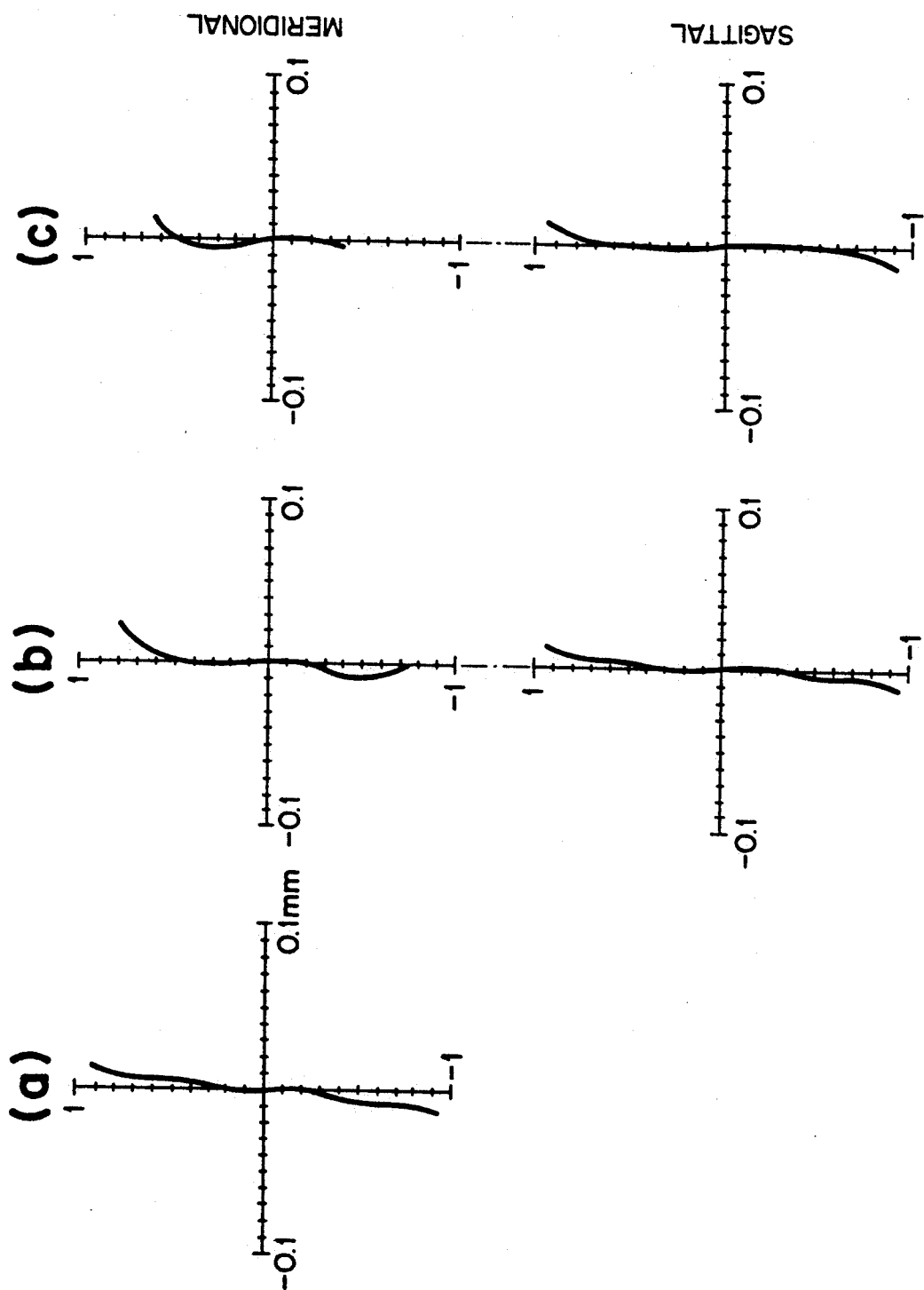
Figure 15:
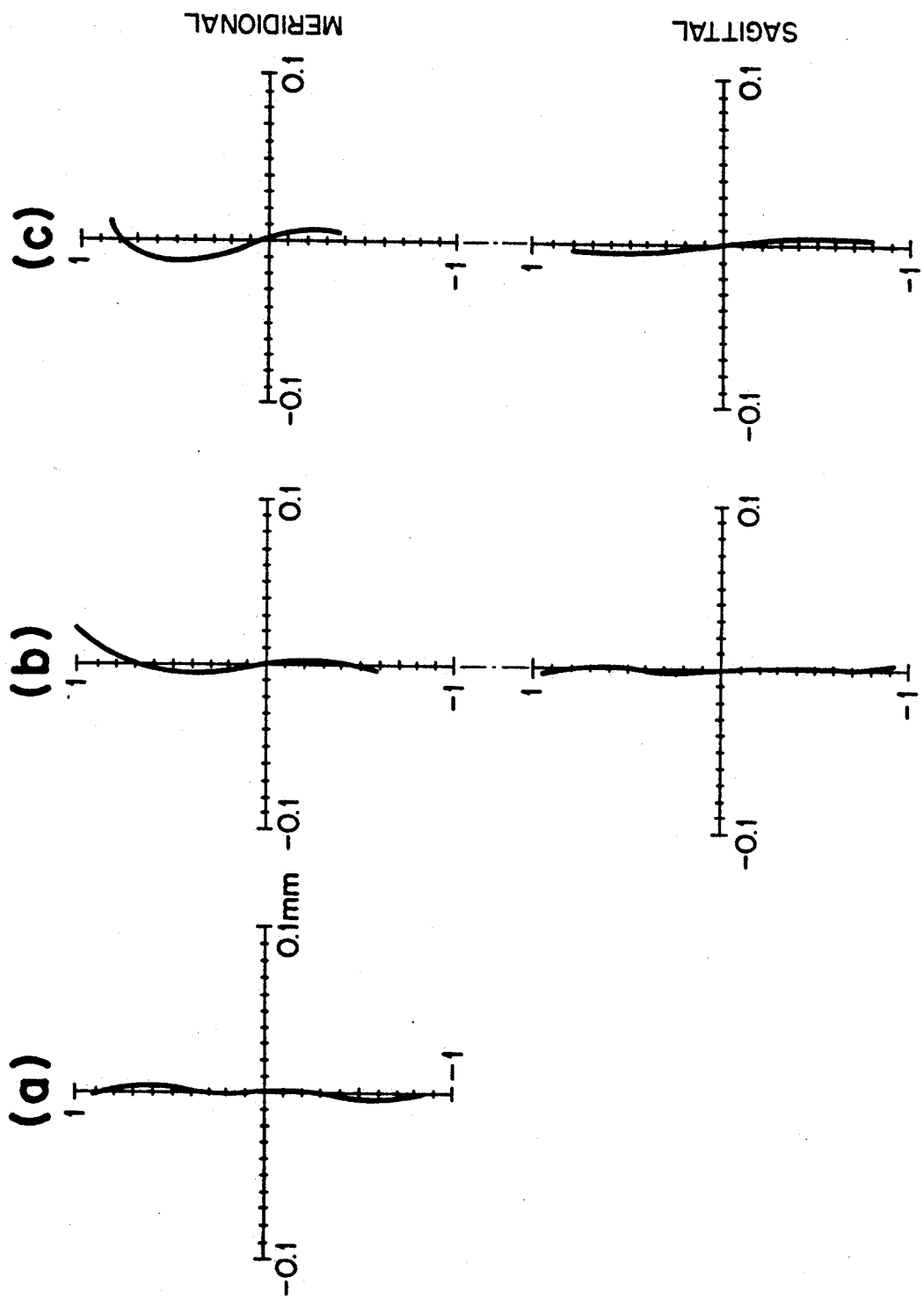
Figure 16:
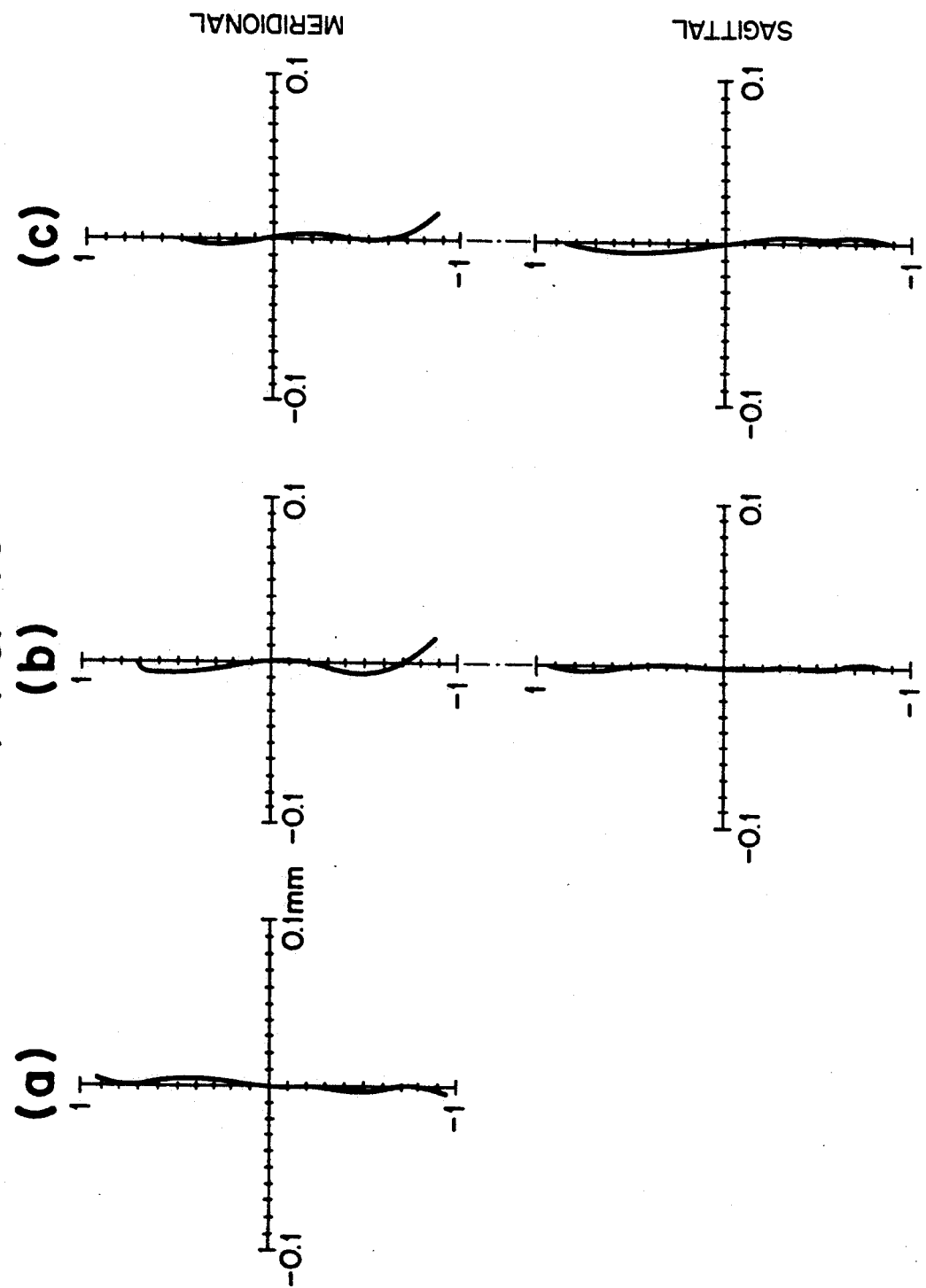
Figure 17:
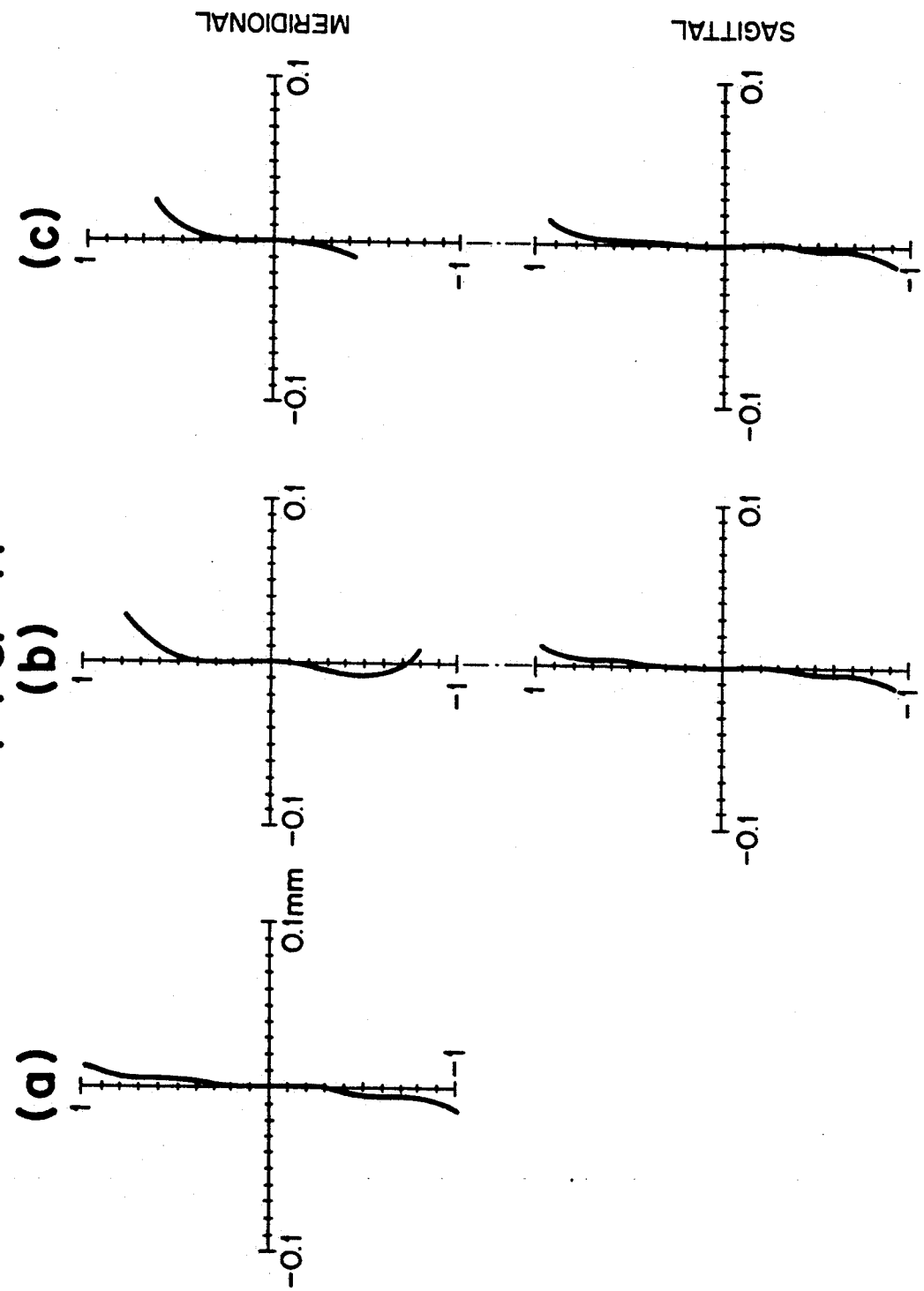
Figure 18:
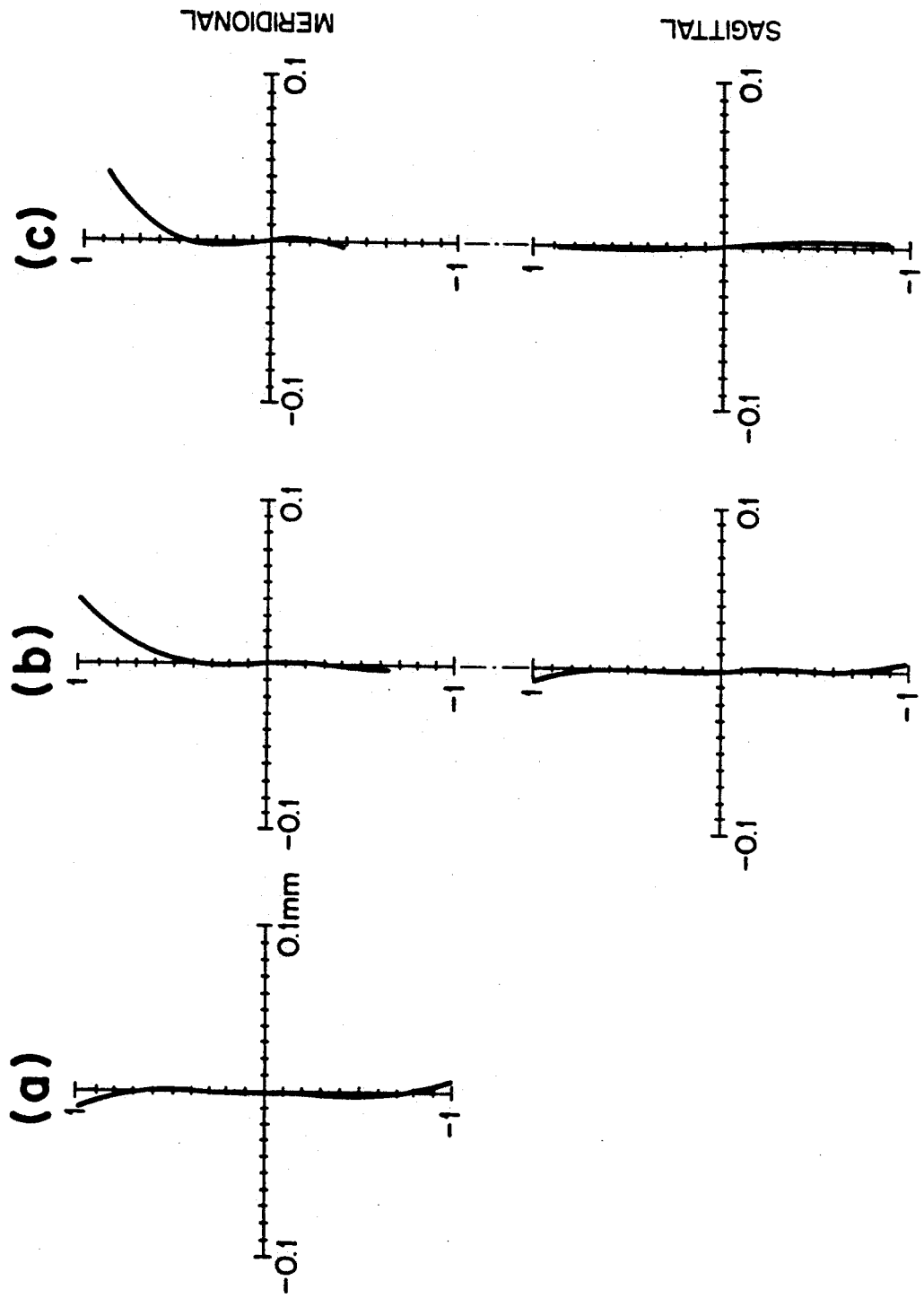
Figure 19:
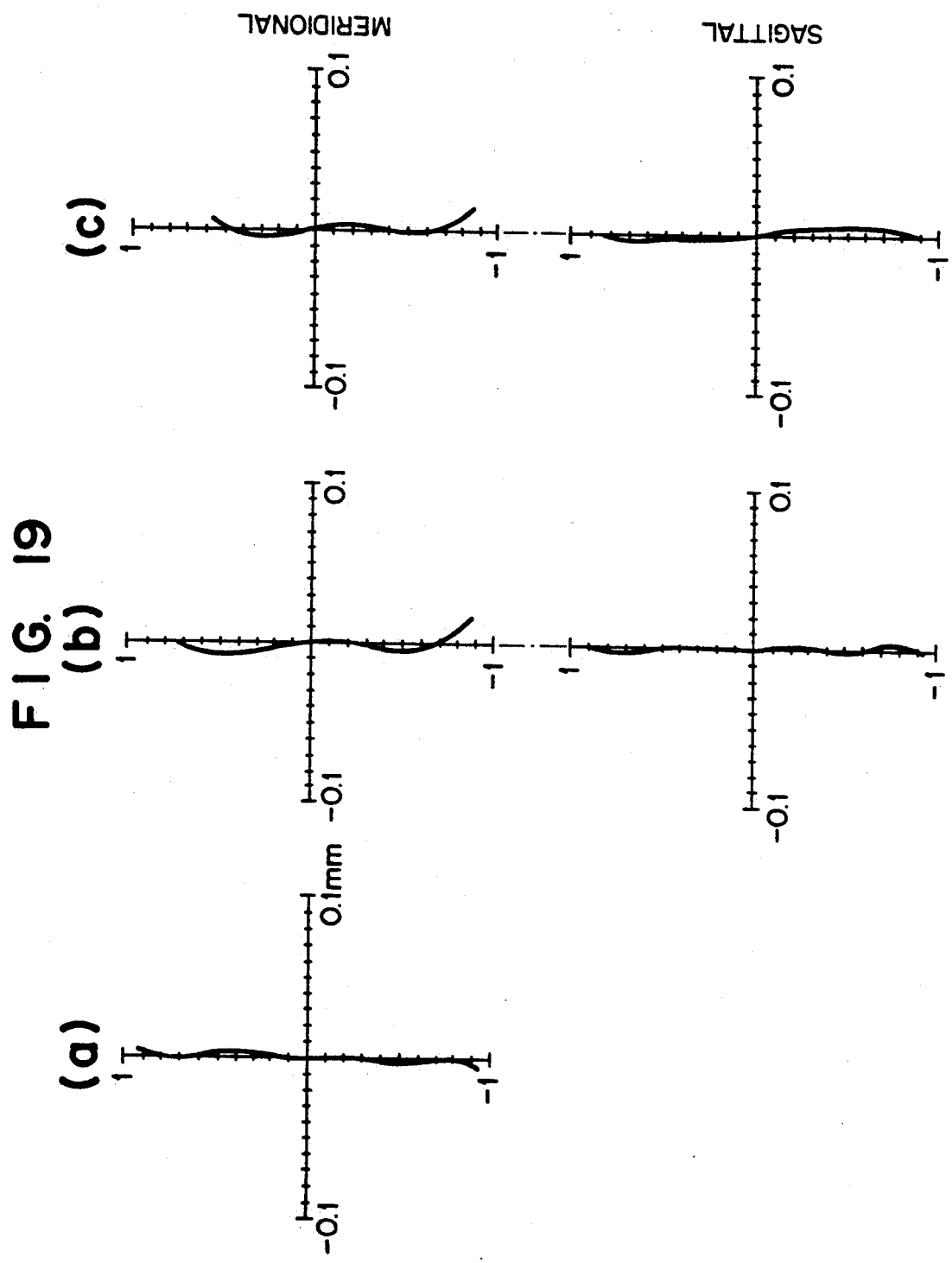
Figure 20:
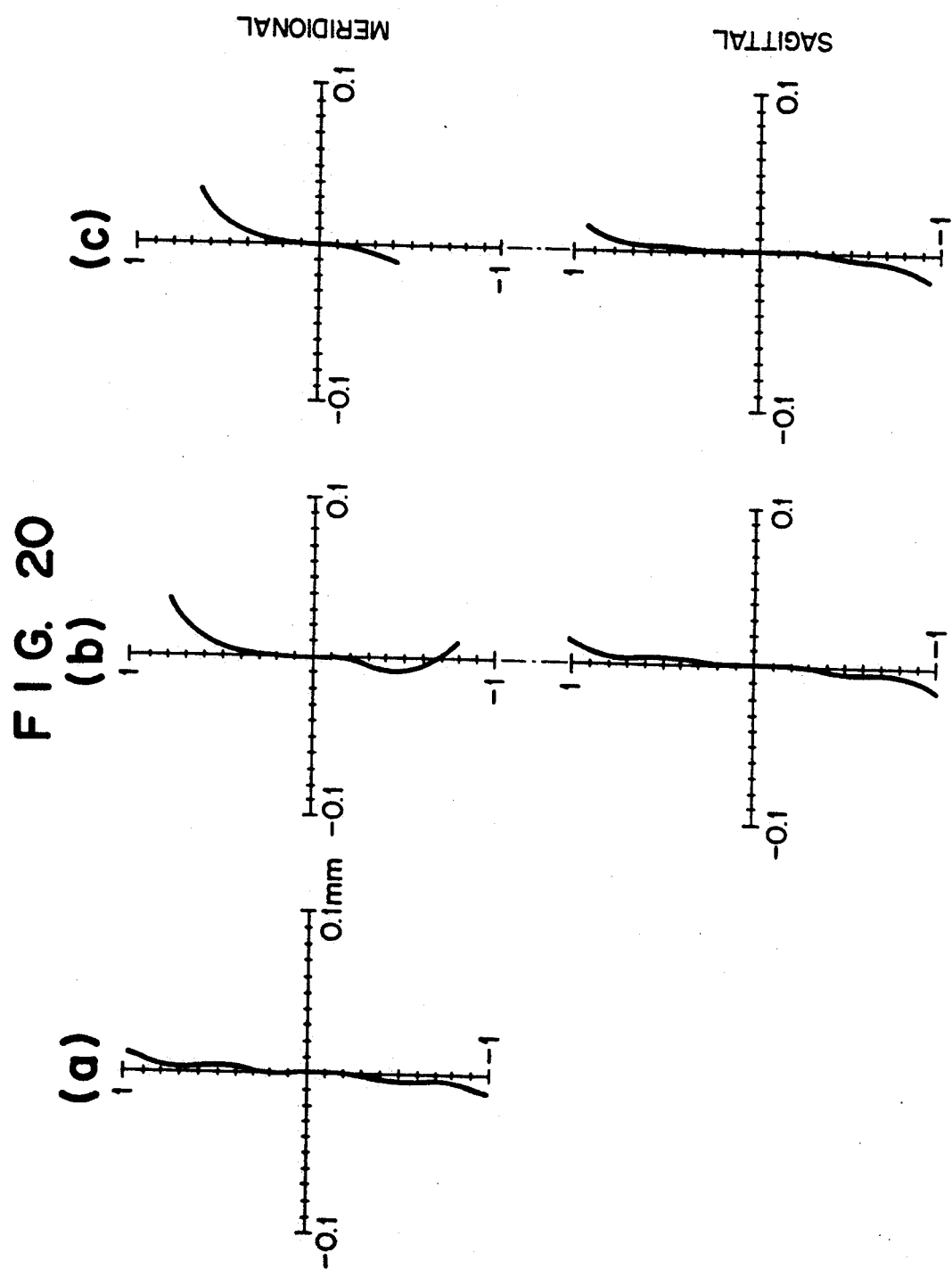
Figure 21:
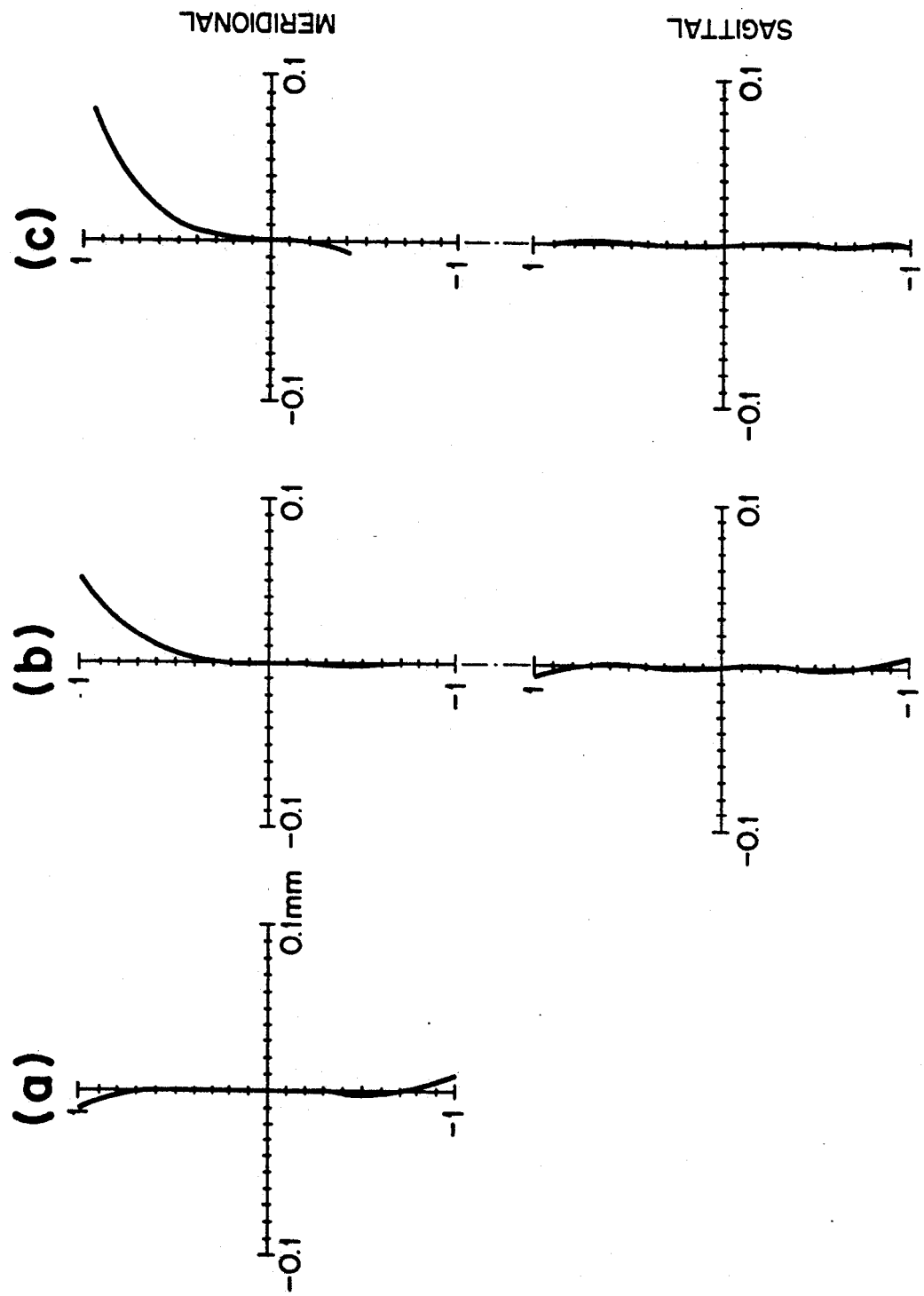

The aberration characteristic curves of the zoom lens system according to the second embodiment of the invention are illustrated in FIGS. 13 to 21 similarly to those of the first embodiment. More specifically, FIGS. 13 to 15 show the characteristic curves representing aberrations of the zoom lens system according to the second embodiment at the focal lengths of 9.2 mm, 32.7 mm and 51.0 mm, respectively, when the object distance is infinite (∞). FIGS. 16 to 18 are characteristic curves representative of aberrations appearing at the abovementioned focal lengths, respectively, when the object distance is 2 m. FIGS. 19 to 21 show characteristic curves of aberrations at the focal lengths mentioned above, respectively, when the object distance is 1.2 m.

As is apparent from the foregoing description of the illustrative embodiments of the invention, there can be obtained a rear focusing type zoom lens system in which the focusing is performed by moving the single lens in the fifth lens group while maintaining the aberrations corrected successfully.

According to the teachings of the invention, there can thus be provided a rear focusing type zoom lens system with a high variable magnification power of the structure in which a single lens element of the fifth lens group is moved upon focusing, with advantageous effect that the whole zoom lens system can be much miniaturized because of a reduced load imposed on the focusing motor.

We claim:

1. A rear focusing type zoom lens system, comprising:
a first lens group having a positive refracting power;
second and third lens groups having negative refracting powers, respectively, and serving for zooming function when moved along an optical axis;
a fourth lens group having a positive refracting power and constantly held stationarily; and
a fifth lens group having a positive refracting power and serving for image formation function;
said first to fifth lens groups being arranged in the above-mentioned order as viewed from the object side,
wherein said fifth lens group includes a first lens element having a positive refracting power, a second lens element having a negative refracting power and a third lens element having a positive refracting power, and focusing is performed by moving a single lens element having positive refracting power of said fifth lens group along said optical axis.

2. A rear focusing type zoom lens system according to claim 1, wherein said fourth lens group includes a lens element having at least one lens surface which is aspherical.

3. A rear focusing type zoom lens system according to claim 1, wherein said single lens element is said third lens element of said fifth lens group.

4. A rear focusing type zoom lens system according to claim 1, wherein said single lens element of said fifth lens group is the lens element located most remotely from the object side (closest to an image formation plane) along the optical axis.

5. A rear focusing type zoom lens system according to claim 1, wherein the zoom lens system has a zoom ratio of at least six and an F-number of about 1.8.

6. A rear focusing type zoom lens system, comprising:
a first lens group having a positive refracting power;
second and third lens groups having negative refracting powers, respectively, and serving for zooming function when moved along an optical axis;
a fourth lens group having a positive refracting power and constantly held stationarily; and
a fifth lens group having a positive refracting power and serving for image formation function;
said first to fifth lens groups being arranged in the above-mentioned order as viewed from the object side,
wherein said fifth lens group includes a first lens element having a positive refracting power, a second lens element having a negative refracting power and a third lens element having a positive refracting power which are arranged sequentially in this order when viewed from the object side, and focusing is performed by moving said third lens element of said fifth lens group along the optical axis, and a condition $f_F/f_W > 2.8$ is satisfied, where $f_F$ represents a focal length at a wide angle end of a lens assembly including said first lens group to said second lens element of said fifth lens group and $f_W$ represents a focal length at a wide angle end of the whole zoom lens system.

7. A rear focusing type zoom lens system according to claim 6, wherein said fourth lens group includes a lens element having at least one lens surface which is aspherical.

8. A rear focusing type zoom lens system, comprising:
a first lens group having a positive refracting power;
second and third lens groups having negative refracting powers, respectively, and serving for zooming function when moved along an optical axis;
a fourth lens group having a positive refracting power and constantly held stationarily; and
a fifth lens group having a positive refracting power and serving for image formation function;
said firth to fifth lens groups being arranged in the above-mentioned order as viewed from the object side,
wherein focusing is performed by moving a single lens element located most remotely from the object side (closest to an image formation plane) along the optical axis, and a condition $$f_F/f_W > 2.8$$

is satisfied, where $f_F$ represents a focal length at a wide angle end of a lens assembly including said first lens group to a lens element located closest but one to said image formation plane and $f_W$ represents a focal length at a wide angle end of the whole zoom lens system.

9. A rear focusing type zoom lens system according to claim 8, wherein said fourth lens group includes a lens element having at least one lens surface which is aspherical.

10. A rear focusing type zoom lens system, comprising:
a first lens group having a positive refracting power;
second and third lens groups having negative refracting powers, respectively, and serving for zooming function when moved along an optical axis;
a fourth lens group having a positive refracting power and constantly held stationarily; and
a fifth lens group having a positive refracting power and serving for image formation function;
said first to fifth lens groups being arranged in the above-mentioned order as viewed from the object side,
wherein focusing is performed by moving a single lens element located most remotely from the object side (closest to an image formation plane) along the optical axis, and a condition $$2.8 < f_F/f_W < 10.0$$

is satisfied, where $f_F$ represents a focal length at a wide angle end of a lens assembly including said first lens group to a lens element located closest but one to said image formation plane and $f_W$ represents a focal length at a wide angle end of the whole zoom lens system.

11. A rear focusing type zoom lens system according to claim 10, wherein said fourth lens group includes a lens element having at least one lens surface which is aspherical.

* * * * *